(12) United States Patent
Jaber et al.

(10) Patent No.: US 10,500,957 B2
(45) Date of Patent: Dec. 10, 2019

(54) METER CLUSTER AND METER CLUSTER SYSTEM

(71) Applicants: DENSO International America, Inc., Southfield, MI (US); DENSO CORPORATION, Kariya, Aichi-pref (JP)

(72) Inventors: Charles Jaber, West Bloomfield, MI (US); Kazushige Hara, West Bloomfield, MI (US); Gareth Webb, Farmington, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/672,557

(22) Filed: Aug. 9, 2017

(65) Prior Publication Data
US 2018/0215267 A1 Aug. 2, 2018

Related U.S. Application Data

(60) Provisional application No. 62/451,123, filed on Jan. 27, 2017.

(51) Int. Cl.
| | |
|---|---|
| *B60K 37/06* | (2006.01) |
| *B60Q 3/14* | (2017.01) |
| *B60K 37/02* | (2006.01) |
| *G02B 27/01* | (2006.01) |
| *B60Q 3/18* | (2017.01) |
| *B60Q 3/85* | (2017.01) |
| *B60K 35/00* | (2006.01) |

(52) U.S. Cl.
CPC .............. *B60K 37/06* (2013.01); *B60K 35/00* (2013.01); *B60K 37/02* (2013.01); *B60Q 3/14* (2017.02); *B60Q 3/18* (2017.02); *B60Q 3/85* (2017.02); *G02B 27/0101* (2013.01); *B60K 2370/167* (2019.05); *B60K 2370/179* (2019.05); *B60K 2370/20* (2019.05); *B60K 2370/27* (2019.05); *B60Y 2400/3017* (2013.01)

(58) Field of Classification Search
CPC .......... B60K 37/06; B60K 37/02; B60Q 3/85; B60Q 3/18; B60Q 3/14; G02B 27/0101
See application file for complete search history.

(56) References Cited

U.S. PATENT DOCUMENTS

| | | | | |
|---|---|---|---|---|
| 3,930,459 | A * | 1/1976 | Barrow | G01P 1/08 116/2 |
| 4,194,587 | A * | 3/1980 | Shino | B60K 37/02 116/62.4 |
| 6,120,159 | A * | 9/2000 | Inoguchi | B60K 37/02 362/23.01 |
| 7,710,252 | B2 | 5/2010 | Kaya | |

(Continued)

*Primary Examiner* — Ryan W Sherwin

(57) ABSTRACT

The present disclosure provides a meter cluster. The meter cluster includes a first luminous panel and a second luminous panel. The first luminous panel indicates first information. The second luminous panel is arranged in front of the first luminous panel. The second luminous panel indicates second information. Each of the first luminous panel and the second luminous panel has transparency. The first information of the first luminous panel is visible through the second luminous panel.

8 Claims, 8 Drawing Sheets

(56) References Cited

U.S. PATENT DOCUMENTS

| | | | |
|---|---|---|---|
| 8,534,218 B2* | 9/2013 | Ewers | B60K 37/02 |
| | | | 116/301 |
| 2002/0149495 A1* | 10/2002 | Schach | G01D 11/28 |
| | | | 340/815.78 |
| 2005/0212669 A1* | 9/2005 | Ono | B60K 37/02 |
| | | | 340/461 |
| 2006/0174814 A1* | 8/2006 | Harada | B60K 35/00 |
| | | | 116/62.1 |
| 2007/0157869 A1* | 7/2007 | Takato | B60K 37/02 |
| | | | 116/286 |
| 2009/0009983 A1* | 1/2009 | Eich | B60K 35/00 |
| | | | 362/23.18 |
| 2009/0174682 A1* | 7/2009 | Bowden | B60K 35/00 |
| | | | 345/173 |
| 2014/0362076 A1* | 12/2014 | Bell | G02F 1/133603 |
| | | | 345/419 |
| 2017/0192531 A1* | 7/2017 | Sanchez Lopez | B60K 35/00 |

* cited by examiner

METER CLUSTER AND METER CLUSTER SYSTEM

CROSS REFERENCE TO RELATED APPLICATION

This application claims the benefit of Applicants' prior provisional application, number 62/451,123, filed on Jan. 27, 2017.

TECHNICAL FIELD

The present disclosure relates to a meter cluster and a meter cluster system.

BACKGROUND

Some vehicles are equipped with a meter cluster in a dashboard in front of the driver seat. Typical meter clusters include a speedometer and a tachometer that are arranged in parallel along a lateral direction. Each of the speedometer and the tachometer includes an own pointer. That is, a first pointer is disposed to indicate a vehicle speed shown on the speedometer and a second pointer is disposed to indicate a rotation speed shown on the tachometer.

SUMMARY

It is one object of the present disclosure to provide a meter cluster that has a multiple layer structure.

It is another object of the present disclosure to provide a meter cluster that has a single pointer commonly used to indicate a plurality of panels.

A first aspect of the present disclosure provides a meter cluster. The meter cluster includes a first luminous panel and a second luminous panel. The first luminous panel indicates first information. The second luminous panel is arranged in front of the first luminous panel. The second luminous panel indicates second information. Each of the first luminous panel and the second luminous panel has transparency. The first information of the first luminous panel is visible through the second luminous panel.

A second aspect of the present disclosure provides a meter cluster system. The meter cluster system includes a first luminous panel, a second luminous panel, a first light source, a second light source, and a controller. The first luminous panel indicates first information. The second luminous panel is arranged in front of the first luminous panel. The second luminous panel indicates second information. The first light source emits a light toward the first luminous panel. The second light source emits a light toward the second luminous panel. The controller controls the first light source and the second light source. Each of the first luminous panel and the second luminous panel has transparency. The first information is lit when the controller controls the first light source to emit the light. The second information is lit when the controller controls the second light source to emit the light. The first information of the first luminous panel is visible through the second luminous panel.

DRAWINGS

The drawings described herein are for illustrative purposes only of selected embodiments and not all possible implementations, and are not intended to limit the scope of the present disclosure. In the drawings.

Figure 6:
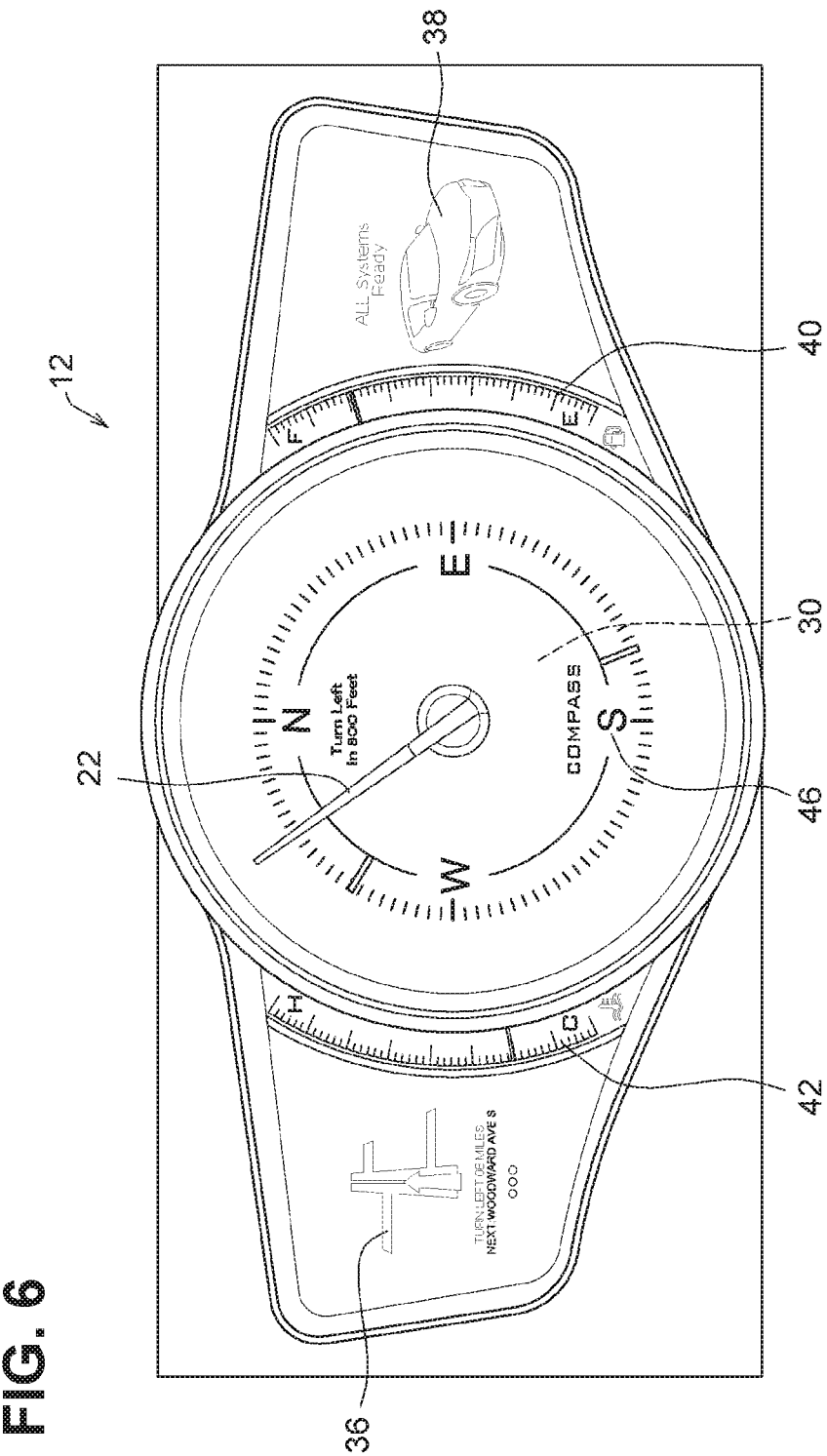
Figure 7:
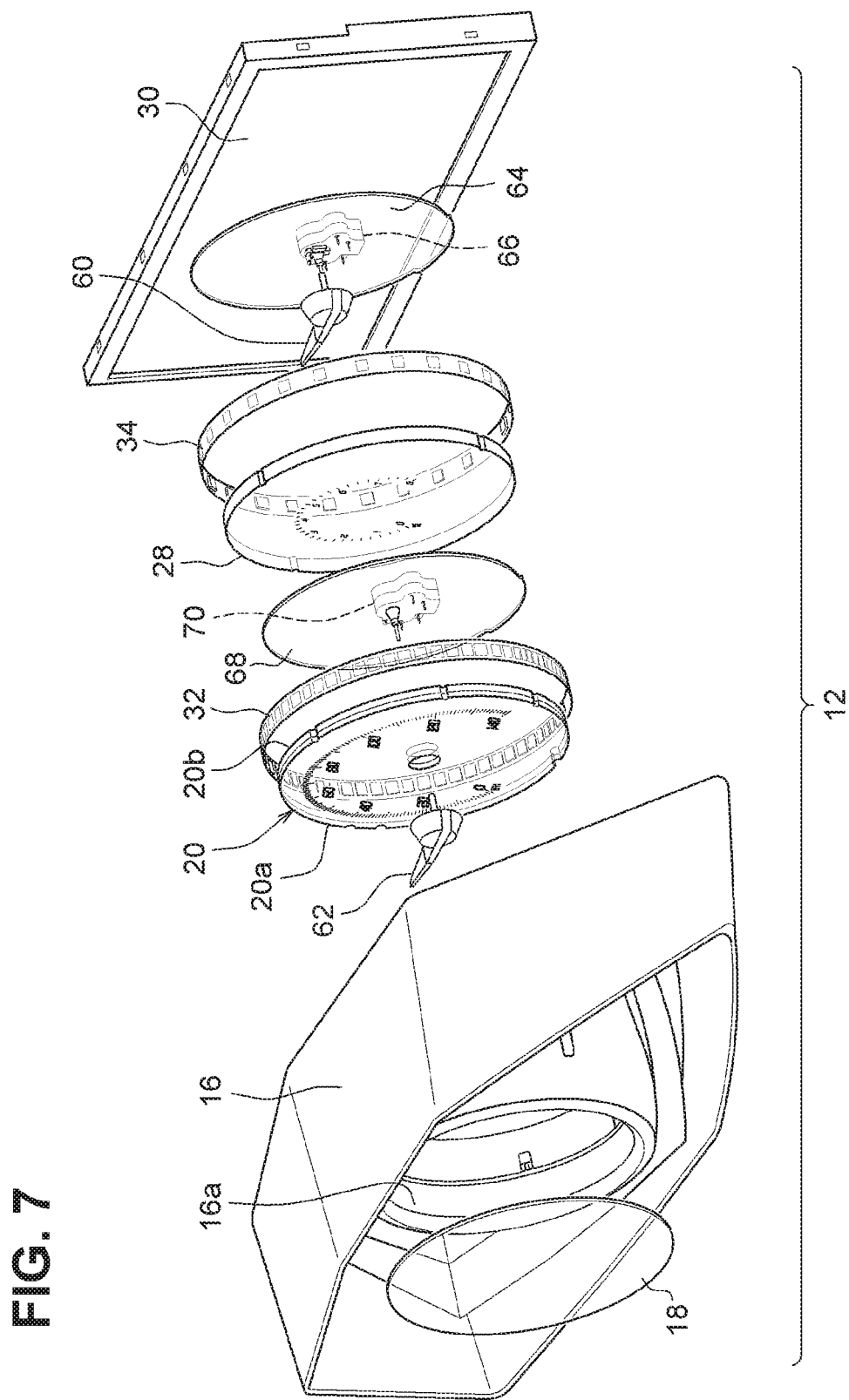
Figure 8:
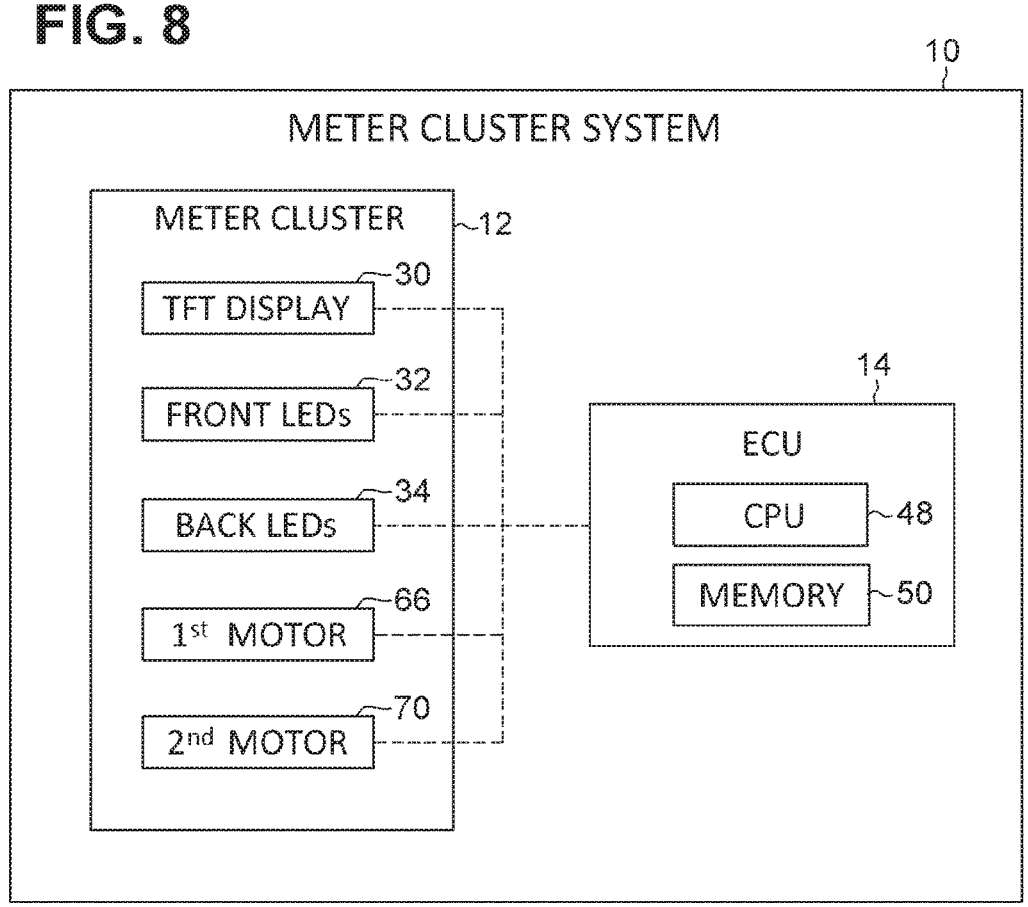
Figure 9:
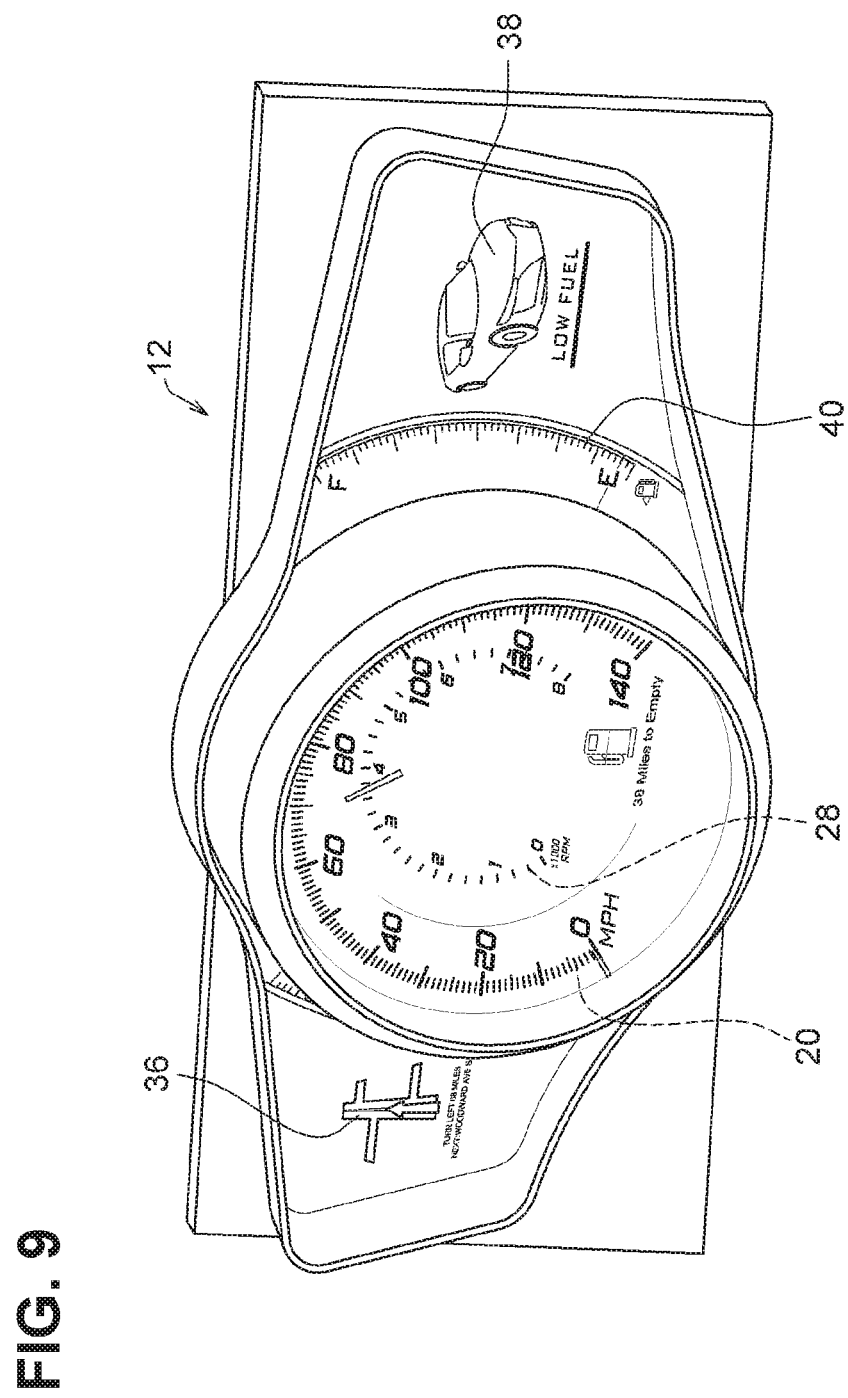

FIG. 6 a front view of the meter cluster in a special mode when viewed from the front side;

FIG. 7 is an exploded perspective view of a meter cluster according to a second embodiment;

FIG. 8 is a block diagram of a meter cluster system according to the second embodiment, and FIG. 9 is a perspective view of the meter cluster in a regular mode according to the second embodiment.

DETAILED DESCRIPTION

As follows, a plurality of embodiments of the present disclosure will be described with reference to drawings. It will be apparent to those skilled in the art from this disclosure that the following descriptions of the embodiments are provided for illustration only and not for the purpose of limiting the invention as defined by the appended claims and their equivalents. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts may be combined. The embodiments may be partially combined even if it is not explicitly described that the embodiments may be combined, provided there is no harm in the combination.

(First Embodiment)

Figure 1:
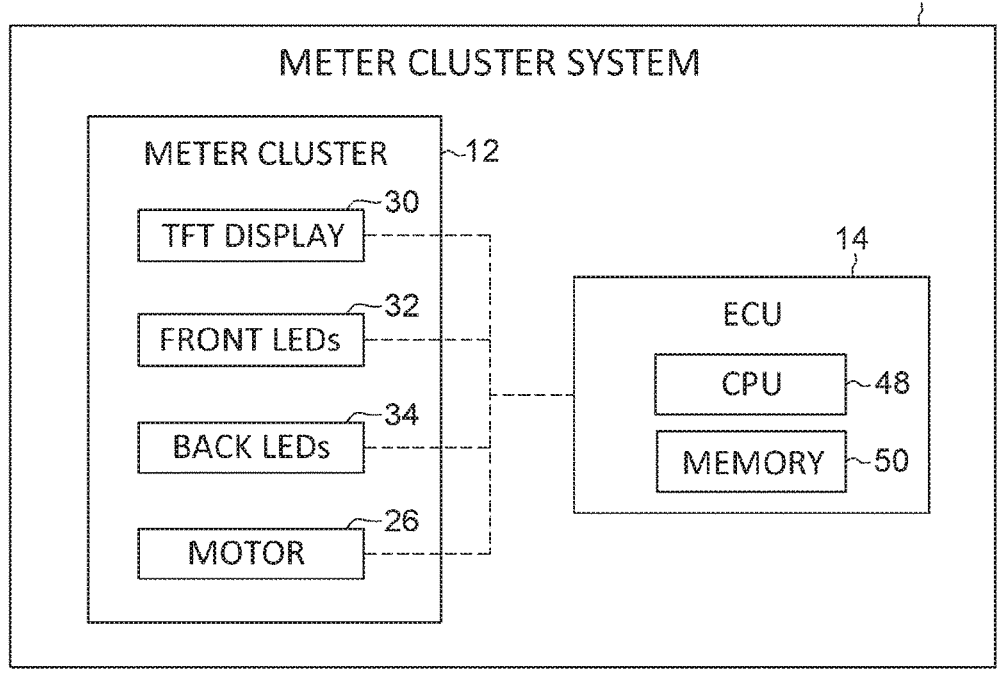
FIG. 1 is a block diagram of a meter cluster system according to a first embodiment.

FIG. 1 shows a block diagram schematically illustrating a meter cluster system 10 according to the first embodiment (hereinafter, referred to as a "system 10"). The system 10 mainly includes a meter cluster 12 and an electronic control unit (ECU 14), i.e., a controller. The meter cluster 12 is disposed in, e.g., a dashboard (not shown) of a passenger compartment of a vehicle. The meter cluster 12 is positioned ahead of the driver seat in the passenger compartment. As shown in FIG. 1, the meter cluster 12 is electrically connected to the ECU 14, and the ECU 14 electrically controls the entire operation of the meter cluster 12.

Figure 2:
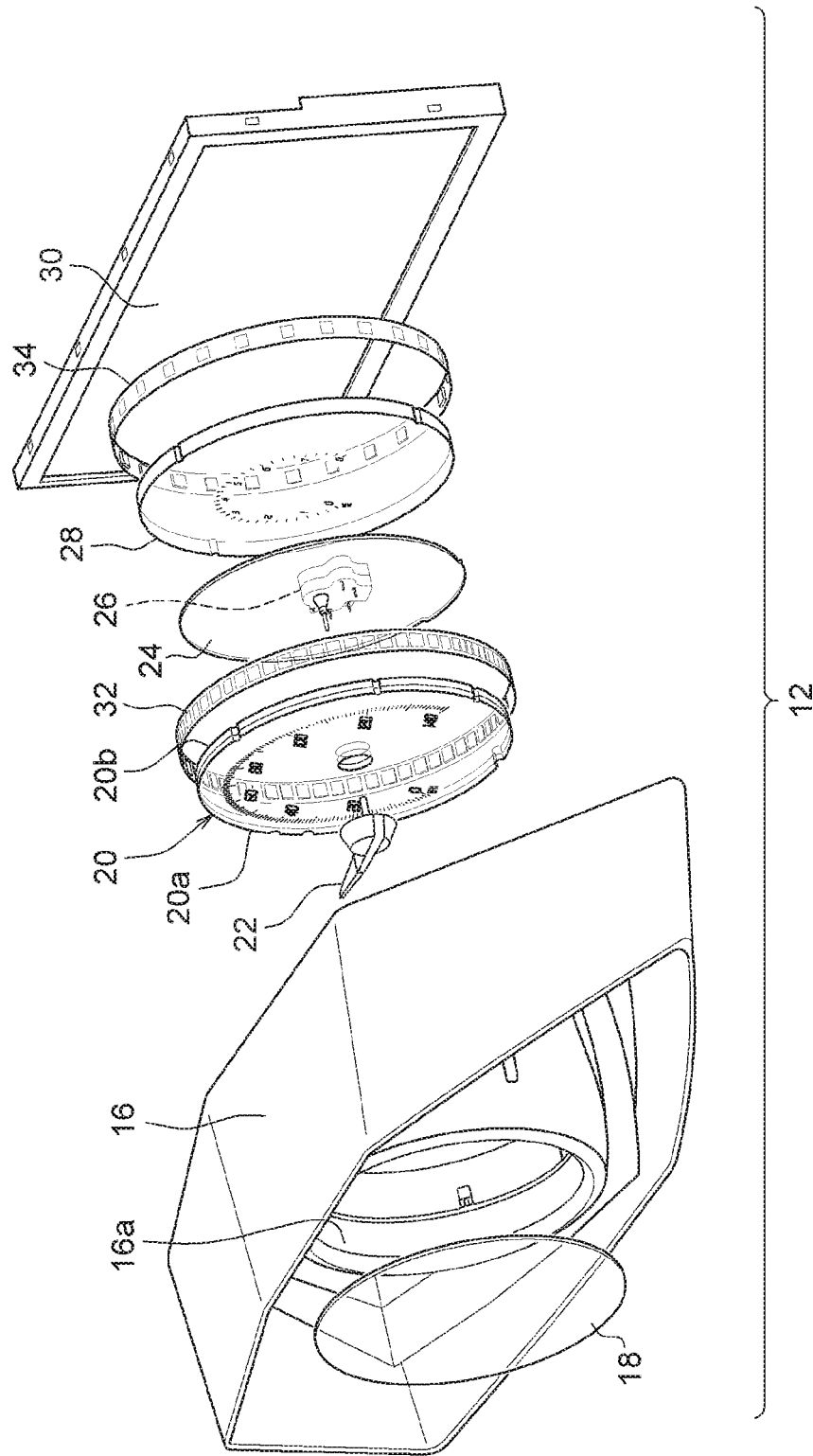
FIG. 2 is an exploded perspective view of a meter cluster.

FIG. 2 shows an exploded perspective view of the meter cluster 12. The meter cluster 12 includes a window frame 16, a cover glass 18, a speedometer panel 20 (a second luminous panel), a pointer 22, a clear ITO (Indium Tin Oxide) glass 24, a motor 26, a tachometer panel 28 (a first luminous panel), and a TFT (Thin Film Transistor) display (display) 30. In the following description, one side of the meter cluster 12 close to the driver seat is referred to as a "front side" and the other side of the meter cluster 12 away from the driver seat is referred to as a "back side".

The window frame 16 is made of plastic material that holds other components therein. The window frame 16 is disposed in a space defined in the dashboard. The window frame 16 includes a cylindrical portion 16a that is open at both the front side and the back side. The cylindrical portion 16a houses therein the speedometer panel 20, the pointer 22, the clear ITO glass 24, the motor 26, and the tachometer panel 28. The cover glass 18 is placed on the front side of the cylindrical portion 16a to cover the front opening of the cylindrical portion 16a. The cover glass 18 has transparency so that information indicated by the meter cluster 12 is visible to the driver through the cover glass 18.

A plurality of front LEDs (a second light source) 32 are arranged in the cylindrical portion 16a (see FIG. 2). The front LEDs 32 are annularly arranged along an outer circumferential surface of the speedometer panel 20. Thus, each of the front LEDs 32 is aligned with the speedometer panel 20 along the radial direction of the cylindrical portion 16a so that the front LEDs 32 circumferentially surround the speedometer panel 20. In other words, the front LEDs 32 face an circumferential edge of the speedometer panel 20. As shown in FIG. 1, the front LEDs 32 are electrically connected to the ECU 14 and on/off operation of the front LEDs 32 is controlled by the ECU 14. When the front LEDs 32 are turned on, each of the front LEDs 32 emits a light toward the center axis of the cylindrical portion 16a, i.e., toward the speedometer panel 20.

Similarly, a plurality of back LEDs (a first light source) 34 are arranged in the cylindrical portion 16a (see FIG. 1). The back LEDs 34 are positioned on the back side of the front LEDs 32. The back LEDs 34 are annularly arranged along an outer circumferential surface of the tachometer panel 28. Thus, each of the back LEDs 34 is aligned with the tachometer panel 28 along the radial direction of the cylindrical portion 16a so that the back LEDs 34 circumferentially surround the tachometer panel 28. In other words, the back LEDs 34 face an circumferential edge of the tachometer panel 28. As shown in FIG. 1, the back LEDs 34 are electrically connected to the ECU 14 and on/off operation of the back LEDs 34 is controlled by the ECU 14. When the back LEDs 34 are turned on, each of the back LEDs 34 emits a light toward the center axis of the cylindrical portion 16a, i.e., toward the tachometer panel 28.

The speedometer panel 20 is an edge lit panel made of a clear/transparent acrylic piece. More specifically, the speedometer is formed of two acrylic layers, a front layer 20a and a back layer 20b. Both the front layer 20a and the back layer 20b have substantially the same circular shape, and are in contact with each other. Thus, the speedometer is formed into, as a whole, a disk shape. Both the front layer 20a and the back layer 20b have transparency, whereby the driver is able to view information indicated by the tachometer panel 28 and information displayed by the TFT display 30 through the speedometer panel 20.

Figure 3:
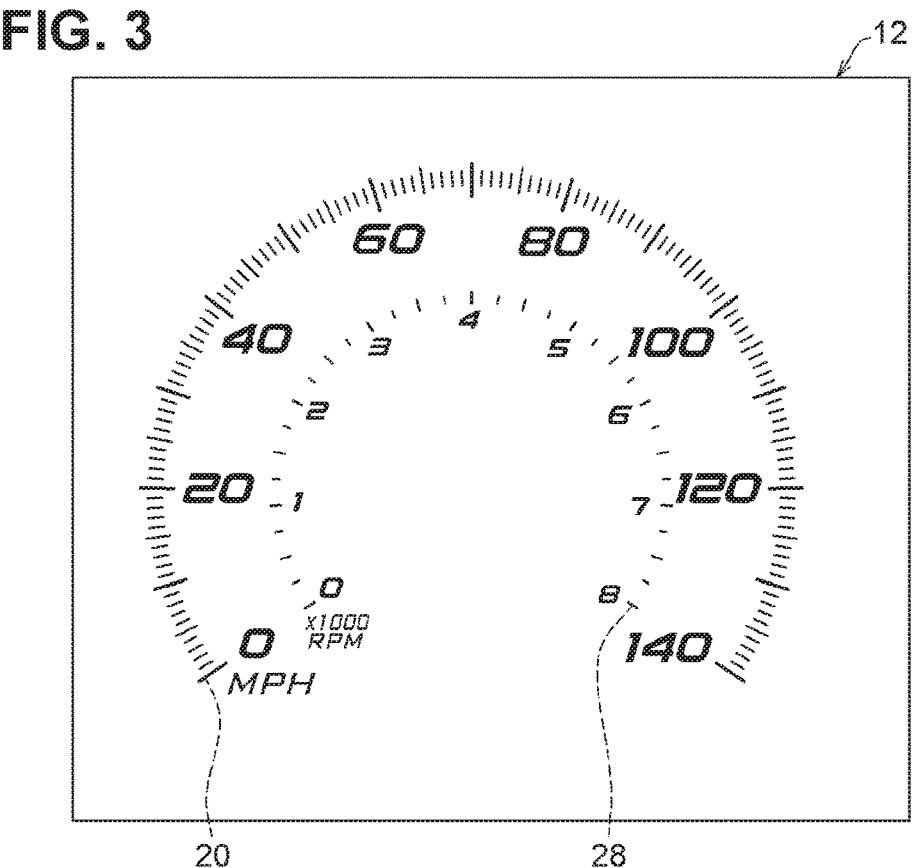
FIG. 3 is a front view of a speedometer panel and a tachometer panel when viewed from a front side.

In the present embodiment, the front layer 20a constitutes a speedometer dial where vehicle speeds (numbers) are formed on one surface of the front layer 20a. More specifically, the vehicle speeds are engraved on, for example, the back surface (facing the back layer 20b) of the front layer 20a. As shown in FIGS. 2 and 3, the vehicle speeds are annularly arranged along the circumferential edge of the front layer 20a. The vehicle speeds are lit when the front LEDs 32 are on (see FIG. 4). In other words, the vehicle speeds are illuminated by the lights emitted from the front LEDs 32.

The back layer 20b constitutes a tick marks dial where tick marks are formed on one surface of the back layer 20b. More specifically, the tick marks are engraved on, for example, the front surface (facing the front layer 20a) of the back layer 20b. As shown in FIGS. 2 and 3, the tick marks are annularly arranged along the circumferential edge of the back layer 20b. Referring to FIG. 3, the tick marks annularly surround the vehicle speeds when viewed from the front side of the meter cluster 12. As with the vehicle speeds, the tick marks are lit when the front LEDs 32 are on. In other words, the tick marks are illuminated by the lights emitted from the front LEDs 32.

With reference to FIG. 2, the pointer 22 is arranged in front of the speedometer panel 20. In this embodiment, the single pointer 22 is commonly used to indicate both the vehicle speeds and rotational speeds (described below). The pointer 22 is connected to the motor 26 through a motor shaft and is rotated by the motor 26 on the front side of the clear ITO glass 24.

The clear ITO glass 24 is a clear panel having a disk shape. The radius of the clear ITO glass 24 is substantially the same as the speedometer panel 20. The information indicated by the tachometer panel 28 and the information displayed by the TFT display 30 are visible to the driver through the clear ITO glass 24. The motor 26 is attached to the clear ITO glass 24 on the back side. As shown in FIG. 1, the motor 26 is electrically connected to the ECU 14, and controlled by the ECU 14.

Similar to the speedometer panel 20, the tachometer panel 28 is an edge lit panel made of a clear/transparent acrylic piece. The tachometer panel 28 is formed of a single acrylic layer. The tachometer panel 28 has transparency, whereby the driver is able to see information displayed by the TFT display 30 through the tachometer panel 28.

The tachometer panel 28 constitutes a tachometer dial where rotation speeds (i.e., RPM) of an engine of the vehicle and tick marks of the rotation speeds are formed on one surface of the tachometer panel 28. More specifically, the rotation speeds and the tick marks are engraved on, for example, the front surface (facing the clear ITO glass 24) of the tachometer panel 28. As shown in FIG. 2, the rotation speeds and the tick marks are annularly arranged in a middle area of the tachometer panel 28 (i.e., an area between the center and the circumferential edge of the tachometer panel 28). The imaginary circle defined by the rotation speeds and the tick marks has a radius that is less than the imaginary circle defined by the vehicle speeds and the tick marks, as shown in FIG. 3. In other words, the rotation speeds and the tick marks are surrounded by the vehicle speeds and their tick marks when viewed from the front side of the meter cluster 12.

Figure 5:
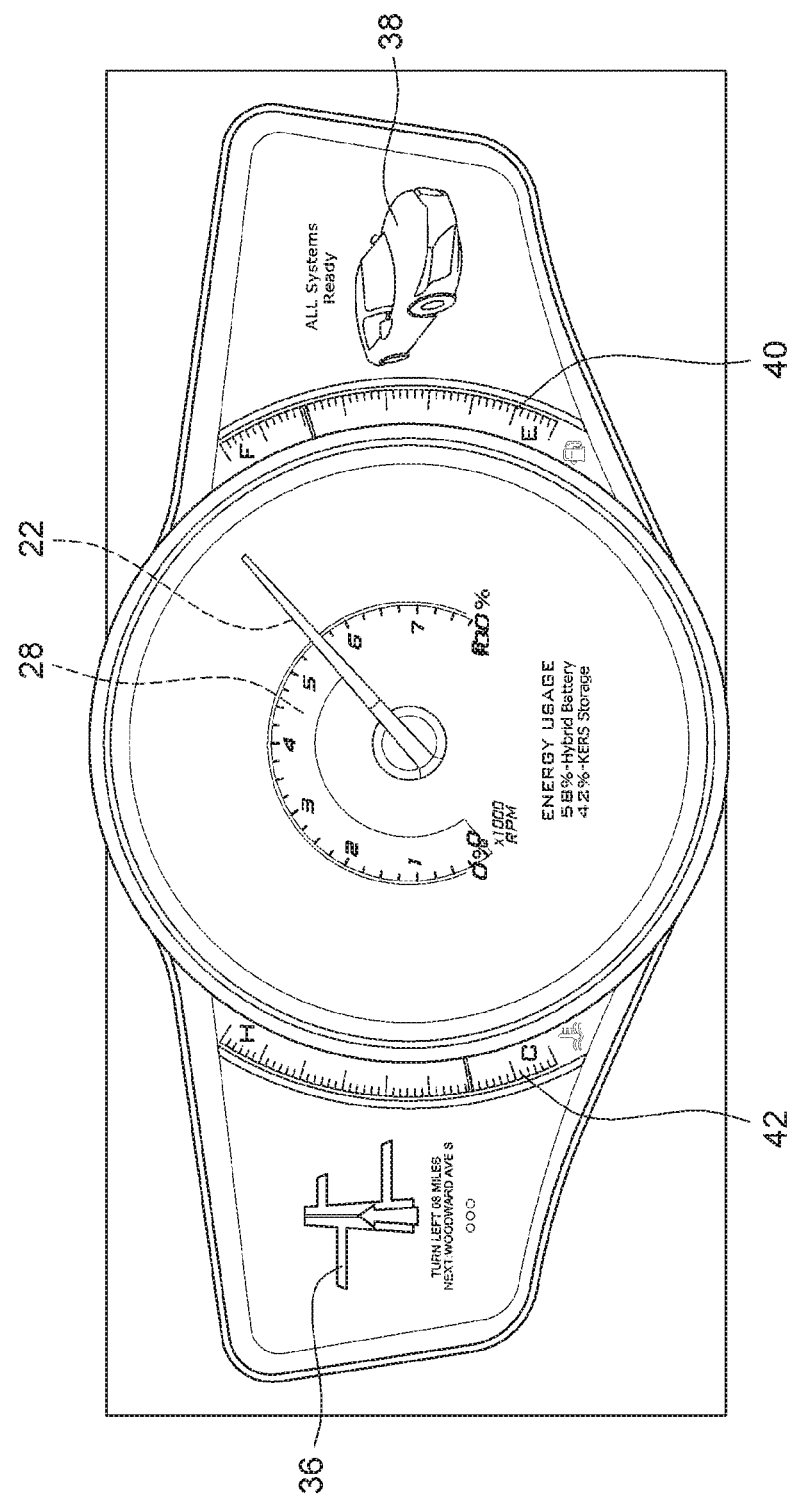
FIG. 5 is a front view of the meter cluster in a second mode when viewed from the front side.

As shown FIG. 5, the rotation speeds and the tick marks are lit when the back LEDs 34 are on. In other words, the rotation speeds and the tick marks are illuminated by the lights emitted from the back LEDs 34.

The TFT display 30 is disposed behind the tachometer panel 28. As shown in FIG. 2, the TFT display 30 has an elongated plate shape extending along a lateral direction (the right-left direction when viewed from the front side of the meter cluster 12). The TFT display 30 is attached to the back side of the window frame 16. As shown FIG. 1, the TFT display 30 is electrically connected to the ECU 14, and the TFT display 30 is configured to display, under control by the ECU 14, a variety of information associated with vehicle/engine conditions and traveling information. For example, the TFT display 30 displays navigation information 36, system conditioning information 38, fuel level information 40, coolant temperature information 42, and so on. In this embodiment, these images 36, 38, 40, 42 are displayed on regions of the TFT display 30 that are not overlapped with the speedometer panel 20 and the tachometer panel 28 when viewed from the front side (see FIGS. 4 and 5).

The TFT display 30 is further configured to display a compass image 46 to show a traveling direction of the vehicle. The compass image 46 is displayed only during a special mode, as will be described below. As shown in FIG.

6, the compass image 46 displayed on the TFT display 30 is viewable from the front side (by the driver) through the speedometer panel 20, the clear ITO glass 24, and the tachometer panel 28.

The ECU 14 is configured to control the entire operation of the meter cluster 12. The ECU 14 includes a central processing unit (CPU 48) and a memory 50 that may include a random access memory (RAM) and read-only memory (ROM). The memory 50 may store computer-readable, computer-executable software code (i.e., programs) containing instructions that are executed by the CPU 48 to perform various functions/modes described herein.

Figure 4:
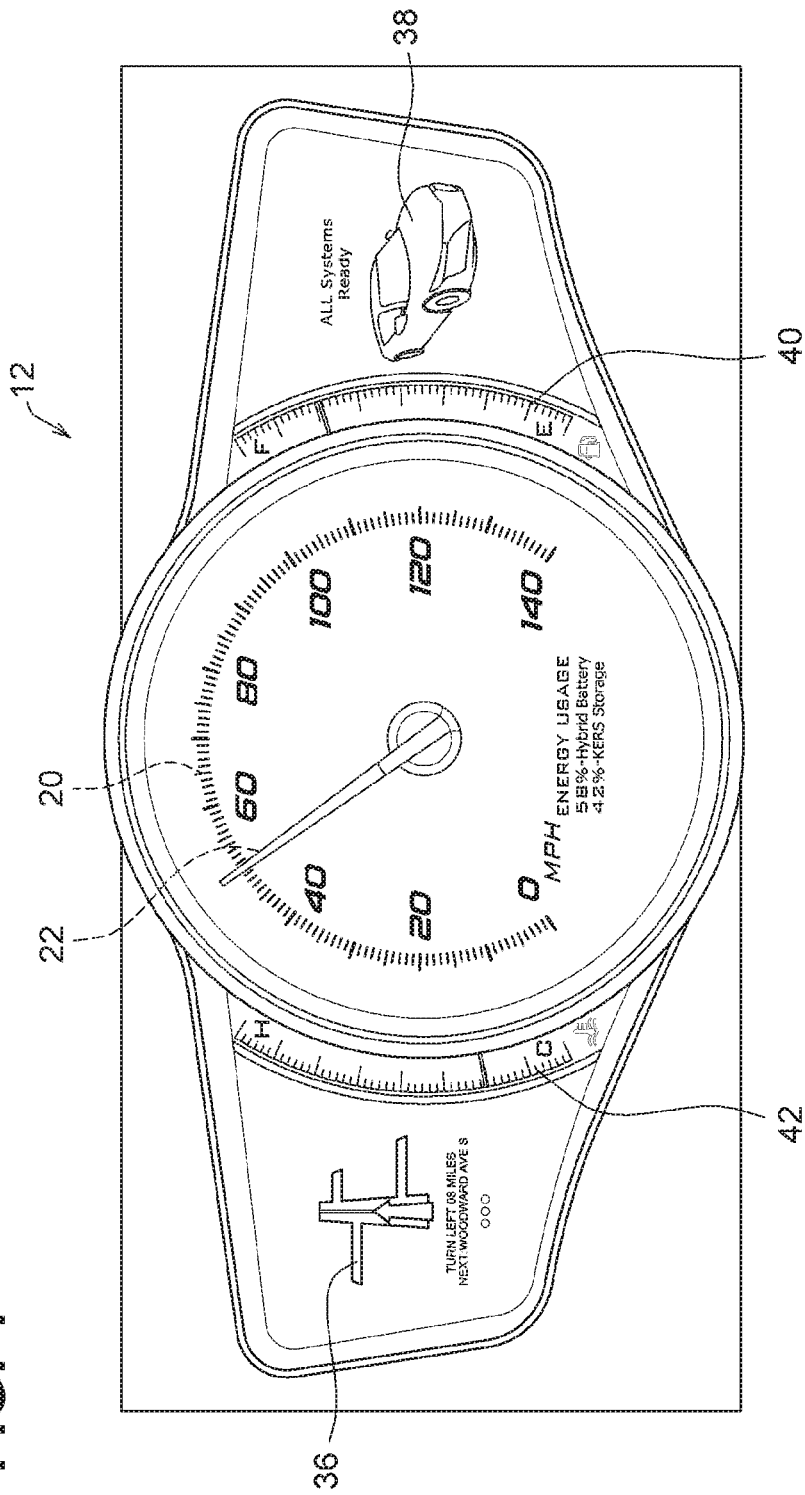
FIG. 4 is a front view of the meter cluster in a first mode when viewed from the front side.

More specifically, the ECU 14 performs a first mode, a second mode, and the special mode. In the first mode, the ECU 14 controls the front LEDs 32 to be on and the back LEDs 34 to be off. Then, the ECU 14 controls the motor 26 to rotate the pointer 22 to indicate the vehicle speed corresponding to the actual, current vehicle speed. Therefore, the driver can recognize the vehicle speed indicated by the pointer 22 during the first mode, as shown in FIG. 4.

In the second mode, the ECU 14 controls the front LEDs 32 to be off and the back LEDs 34 to be on. Then, the ECU 14 controls the pointer 22 to indicate the rotation speed corresponding to the actual, current rotation speed of the engine. Therefore, the driver can recognize the rotation speed (RPM) indicated by the pointer 22 during the second mode, as shown in FIG. 5. In this case, the rotation speeds eliminated by the back LEDs 34 are visible to the driver through the speedometer panel 20.

In the special mode, the ECU 14 controls both the front LEDs 32 and the back LEDs 34 to be off. Then, the ECU 14 controls the TFT display 30 to display the compass image 46 and controls the motor 26 to rotate the pointer 22 to indicate the traveling direction corresponding to the actual, current traveling direction. As a result, the driver can recognize the traveling direction indicated by the pointer 22, as shown in FIG. 6. In this case, the compass image 46 is visible to the driver through the speedometer panel 20 and the tachometer panel 28.

As described above, the meter cluster system 10 according to the present embodiment can display one of the vehicle speeds, the rotation speeds and the compass image 46 by switching the operation mode among the first mode, the second mode, and the special mode. Therefore, the single pointer 22 can be commonly used to indicate one of the vehicle speed, the rotation speed, and the traveling direction.

The vehicle speeds of the speedometer panel 20 and the rotation speeds of the tachometer panel 28 are coaxially arranged (i.e., arranged in the depth direction). This arrangement makes other spaces of the meter cluster 12 available to display other information such as the navigation information 36, the fuel level information 40, and so on. Therefore, the meter cluster 12 can display much more information as compared to a conventional arrangement where the tachometer and the speedometer are arranged in parallel along the lateral direction.

(Second Embodiment)

In the first embodiment, the single pointer 22 is commonly used to indicate the vehicle speeds and the rotations speeds by switching between the first mode and the second mode. In the second embodiment, each of the vehicle speeds and the rotations speeds is indicated by a respective one of two pointers 60, 62.

As shown in FIG. 7, the meter cluster 12 according to the second embodiment includes a first pointer 60 for indicating the rotation speeds and a second pointer 62 for indicating the vehicle speeds.

The first pointer 60 is disposed in front of a first clear ITO glass 64 that is arranged between the tachometer panel 28 and the TFT display 30. The first pointer 60 is connected to a first motor 66 through a motor shaft. The second pointer 62 is disposed in front of a second clear ITO glass 68 that is arranged between the speedometer panel 20 and the tachometer panel 28. The second pointer 62 is connected to a second motor 70 through a motor shaft. The first clear ITO glass 64 and the second clear ITO glass 68 are the same as the clear ITO glass 24 described in the first embodiment.

The first motor 66 and the second motor 70 are electrically connected to the ECU 14 as shown in FIG. 8. The ECU 14 is configured to independently control the first motor 66 and the second motor 70. In the present embodiment, the ECU 14 is configured to perform a regular mode and the special mode. During the regular mode, the ECU 14 controls both the front LEDs 32 and the back LEDs 34 to be on so that the vehicle speeds and the rotations speeds (and their tick marks) are eliminated at the same time, as shown in FIG. 9. As with the first embodiment, the rotation speeds and the tick marks formed on the tachometer panel 28 are surrounded by the vehicle speeds and the tick marks. Thus, the driver is able to see both the vehicle speeds and the rotation speeds at the same time.

In contrast, during the special mode, the ECU 14 is configured to control both the front LEDs 32 and the back LEDs 34 to be off and control the TFT display 30 to display the compass image 46 on thereon. Accordingly, the compass image 46 displayed on the TFT display 30 is visible to the driver through the tachometer panel 28 and the speedometer panel 20, as with the first embodiment (refer to FIG. 6 as described in the first embodiment).

As described above, the meter cluster system 10 according to the second embodiment includes the first and second pointers 60, 62 to indicate the rotation speeds and the vehicle speeds, respectively. In this embodiment, the vehicle speeds and the rotation speeds are eliminated at the same time and the speedometer panel 20 is positioned in front of the tachometer panel 28. Therefore, the vehicle speeds and the rotation speeds are viewed as offset from each other, which effectively creates a sense of depth to the driver as shown in FIG. 9.

(Modifications to Embodiments)

In the first embodiments, the rotation speeds are surrounded by the vehicle speeds when viewed from the front side. However, the circle defined by the rotation speeds may have a radius equal to or greater than that of the circle defined by the vehicle speeds.

In the above-described embodiments, the first luminous panel (the tachometer panel) shows the rotation speeds and the second luminous panel (the speedometer panel) shows the vehicle speeds. However, the first luminous panel and the second luminous panel may show any other type of information, such as navigation information, driving shift position information, and so on.

In the above-described embodiments, the TFT display 30 displays the compass image 46 to show a traveling direction of the vehicle. However, the TFT display 30 may display any type of images, marks, and/or animations in place of, or addition to, the compass image 46.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a;" "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed. As used herein, the term "and/or" includes any and all combinations of one or more of the associated listed items.

What is claimed is:

1. A meter cluster comprising:
    a first luminous panel that indicates first information; and
    a second luminous panel that is arranged in front of the first luminous panel, the second luminous panel indicating second information, wherein
    each of the first luminous panel and the second luminous panel has transparency, and
    the first information of the first luminous panel is visible through the second luminous panel, wherein
    the meter cluster further comprises:
        a first pointer that is used for indicating the first information; and
        a second pointer that is used for indicating the second information,
    the first pointer and the second pointer indicate the first information and the second information, respectively, when both the first information and the second information are lit,
    each of the first information and the second information is shown as a circular shape,
    the first information and the second information are shown to be coaxial with a common axis, and
    the first and second pointers rotate about the common axis,
    the first information is either one of a tachometer and a speedometer,
    the second information is the other one of the tachometer and the speedometer, and
    the first luminous panel is away from the second luminous panel along the common axis and gives the first information depth perception.

2. The meter cluster according to claim 1, further comprising:
    a display that is arranged behind the first luminous panel, the display displaying third information thereon, wherein
    the third information displayed on the display is visible through the first luminous panel and the second luminous panel.

3. The meter cluster according to claim 2, wherein the third information is an image representing a compass.

4. The meter cluster according to claim 1, wherein the tachometer has a diameter that is smaller than that of the speedometer.

5. A meter cluster system comprising:
    a first luminous panel that indicates first information;
    a second luminous panel that is arranged in front of the first luminous panel, the second luminous panel indicating second information;
    a first light source that emits a light toward the first luminous panel;
    a second light source that emits a light toward the second luminous panel; and
    a controller that controls the first light source and the second light source, wherein
    each of the first luminous panel and the second luminous panel has transparency,
    the first information is lit when the controller controls the first light source to emit the light,
    the second information is lit when the controller controls the second light source to emit the light, and
    the first information of the first luminous panel is visible through the second luminous panel,
    the meter cluster system further comprises:
        a first pointer;
        a second pointer;
        a first motor that drives the first pointer to rotate, the first motor being controlled by the controller; and
        a second motor that drives the second pointer to rotate, the second motor being controlled by the controller,
    the controller controls the first light source to emit the light, the second light source to emit the light, the first motor to have the first pointer indicate the first information, and the second motor to have the second pointer indicate the second information,
    each of the first information and the second information is shown as a circular shape,
    the first information and the second information are shown to be coaxial with a common axis, and
    the first and second pointers rotate about the common axis,
    the first information is either one of a tachometer and a speedometer,
    the second information is the other one of the tachometer and the speedometer, and
    the first luminous panel is away from the second luminous panel along the common axis and gives the first information depth perception.

6. The meter cluster system according to claim 5, further comprising
    a display that is arranged behind the first luminous panel, the display displaying third information thereon, wherein
    the third information displayed on the display is visible through the first luminous panel and the second luminous panel.

7. The meter cluster system according to claim 6, wherein the third information is an image representing a compass.

8. The meter cluster system according to claim 5, wherein the tachometer has a diameter that is smaller than that of the speedometer.

* * * * *